United States Patent
Cheng et al.

(10) Patent No.: US 9,996,764 B2
(45) Date of Patent: Jun. 12, 2018

(54) IMAGE MATCHING METHOD BASED ON CASCADED BINARY ENCODING

(71) Applicant: Institute of Automation Chinese Academy of Sciences, Beijing (CN)

(72) Inventors: Jian Cheng, Beijing (CN); Cong Leng, Beijing (CN); Jiaxiang Wu, Beijing (CN); Hanqing Lu, Beijing (CN)

(73) Assignee: Institute of Automation Chinese Academy of Sciences, Beijing (CN)

( * ) Notice: Subject to any disclaimer, the term of this patent is extended or adjusted under 35 U.S.C. 154(b) by 0 days. days.

(21) Appl. No.: 15/306,983

(22) PCT Filed: Apr. 29, 2014

(86) PCT No.: PCT/CN2014/076474
§ 371 (c)(1),
(2) Date: Oct. 26, 2016

(87) PCT Pub. No.: WO2015/165037
PCT Pub. Date: Nov. 5, 2015

(65) Prior Publication Data
US 2017/0053182 A1    Feb. 23, 2017

(51) Int. Cl.
*G06K 9/00* (2006.01)
*G06K 9/46* (2006.01)
*G06F 17/30* (2006.01)
*G06K 9/62* (2006.01)

(52) U.S. Cl.
CPC ..... *G06K 9/4633* (2013.01); *G06F 17/30256* (2013.01); *G06F 17/30268* (2013.01); *G06F 17/30271* (2013.01); *G06K 9/4671* (2013.01); *G06K 9/6215* (2013.01)

(58) Field of Classification Search
CPC .. G06K 9/4633; G06K 9/6215; G06K 9/6407; G06K 9/2009; G06K 9/6423; G06F 17/30268; G06F 17/30271; G06F 17/30256; G06F 17/30249; G06T 7/001
See application file for complete search history.

(56) References Cited

U.S. PATENT DOCUMENTS

| | | | | |
|---|---|---|---|---|
| 4,485,411 A | * | 11/1984 | Yamamoto | G11B 5/00817 358/296 |
| 5,021,971 A | * | 6/1991 | Lindsay | G06T 9/008 375/240.22 |
| 5,398,239 A | * | 3/1995 | Fedor | H04Q 3/00 370/380 |
| 5,457,371 A | * | 10/1995 | Gordon | G01D 5/04 250/231.15 |

(Continued)

*Primary Examiner* — Amir Alavi
(74) *Attorney, Agent, or Firm* — Muncy, Geissler, Olds & Lowe, P.C.

(57) ABSTRACT

An image matching method based on cascaded binary encoding includes using a hashing look-up with multiple hashing tables to coarsely filter candidate key-points in an image to produce a candidate subset of key-points, projecting the candidate subset into a high-dimensional Hamming space, and building a "Hamming distance-memory address" hashing table. An optimal matching key-point is discovered by querying the hashing table. The image matching method has high processing speed and matching quality, which can be used for efficient and accurate image matching.

5 Claims, 1 Drawing Sheet

---

The hashing table look-up with multiple hashing tables is used to coarsely filter candidate key-points in the image to produce a candidate subset of key-points.     101

↓

Projecting all the key-points in the candidate subset into a high-dimensional Hamming space.     102

↓

A "Hamming distance-memory address" hashing table is built, and the optimal matching key-point is discovered by querying this hashing table.     103

(56) References Cited

U.S. PATENT DOCUMENTS

| | | | | |
|---|---|---|---|---|
| 6,546,146 | B1* | 4/2003 | Hollinger | G06T 9/008 375/240.03 |
| 2001/0044708 | A1* | 11/2001 | Talwar | G06F 17/5045 703/2 |
| 2006/0256897 | A1* | 11/2006 | Wolf | H03M 13/4107 375/341 |
| 2009/0150412 | A1* | 6/2009 | Idicula | G06F 17/2247 |
| 2017/0053182 | A1* | 2/2017 | Cheng | G06F 17/30256 |

\* cited by examiner

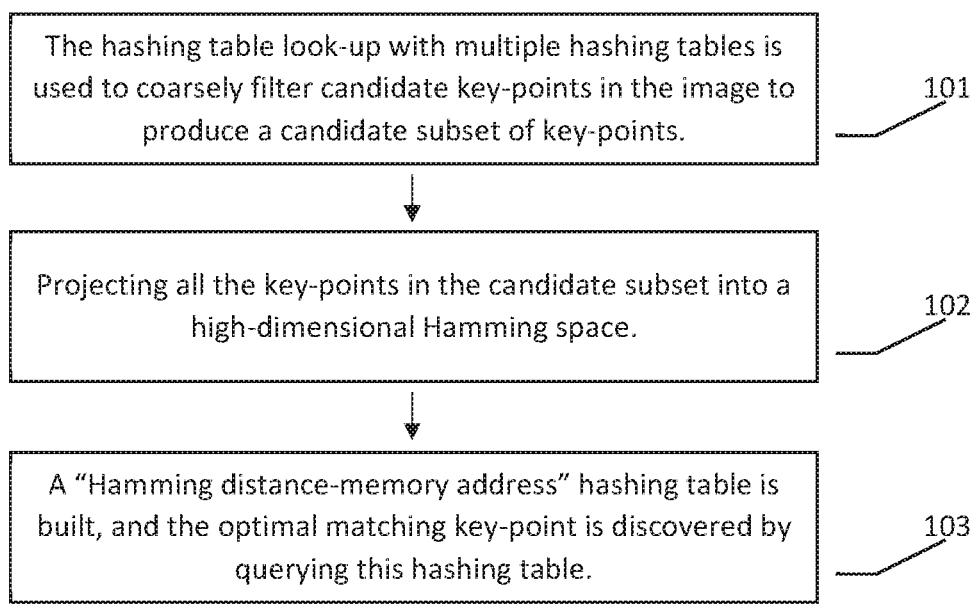

IMAGE MATCHING METHOD BASED ON CASCADED BINARY ENCODING

CROSS-REFERENCE TO RELATED APPLICATIONS

This application is the U.S. National Stage Entry under 35 U.S.C. § 371 of International Application No. PCT/CN2014/076474, filed on Apr. 29, 2014.

TECHNICAL FIELD

This invention involves the image processing field, particularly involves an image matching method based on the cascaded binary encoding.

BACKGROUND OF THE ART

Image matching is one of the core techniques in the computer vision and image processing domains, of which wide applications are found in 3-D reconstruction, image stitching, and object recognition. Particularly, in the context of 3-D reconstruction of large-scale scenes, due to the time consuming in the process of the large-scale image matching, 3-D reconstruction often suffers from the low processing speed. Therefore, it is urgent to resolve the fast and accurate image matching issue.

Image matching techniques can be roughly categorized into three groups: point matching, line matching, and region matching. Due to its robustness to illumination variations, affine transformation, and view-angle changes, point matching is mostly concerned and many effective algorithms have been proposed. Nevertheless, point matching can be very time-consuming: the time complexity of point matching between two images is $O(N^2)$, where N is the average number of key-points in each image. For the brute-force matching method, the key-point matching problem can be regarded as a nearest neighbor search problem. As an alternative, approximate nearest neighbor search is proposed, e.g. the famous tree-based key-point matching algorithm. In this algorithm, data are efficiently stored in a tree-like structure to speed-up the search process. Yet, all tree-based methods tend to be much less efficient when dealing with high-dimensional data, and may even be inferior to the simple linear scan.

SUMMARY OF THE INVENTION

Aiming at these shortages, the objective of this invention is to provide an image matching method based on the cascaded binary encoding, so as to achieve efficient and accurate image matching.

To achieve the above objective, this invention provides an image matching method based on the cascaded binary encoding, which includes:

Procedure S1: Using the hashing look-up with multiple hashing tables to coarsely filter candidate key-points in the image to produce a candidate subset of the candidate key-points.

Procedure S2: Projecting the candidate subset of the candidate key-points into a high-dimensional Hamming space.

Procedure S3: Building a "Hamming distance-memory address" hashing table, and obtaining the optimal matching key-point by querying this hashing table.

Further, the stated Procedure S1 is specified as: Procedure S11, perform the coarse hashing look-up with short hashing codes, in which all the key-points in the images are mapped as m-bit hashing code vectors with the locality sensitive hashing method.

Further, the stated Procedure S11 is specified as: For the first key-point p in the first image I, m-bit hashing code vectors are used to build a hashing look-up table, based on which all the key-points in the second image J that fall into the same hashing bucket with the first key-point p are returned, wherein, L different hashing functions are generated by the locality sensitive hashing method, denoted as $g_l(q)=(h_{1,l}(q), h_{2,l}(q), \ldots, h_{m,l}(q)$, $l=1, 2, \ldots, L$, and a hashing table is then built for each hashing function, and the first key-point p in the first image I is put into the hashing bucket $g_l(p)$, where $l=1, 2, \ldots, L$.

Further, the stated Procedure S2 is specified as: All the key-points in the candidate subset are projected into a high-dimensional Hamming space with an n-bit hashing function (n>m), in which each candidate's Hamming distance to the query point is computed and used as the ranking metric.

Further, the stated Procedure S3 is specified as:

Compute the first Hamming distance between the query point and the candidate key-points;

Build a hashing table, using the first Hamming distance as the key and memory address of the candidate key-point as the value;

Traverse the database of the "Hamming distance-memory address" hashing table and build the "Hamming distance-memory address" hashing table;

The search starts from the table entry with the minimal key, until predetermined candidate key-points have been retrieved, wherein these retrieved key-points are guaranteed to be the top nearest neighbors to the query point in the sense of the Hamming distance.

The image matching method in this invention involves a three-layer hashing structure during the matching process, from which layer-wise filtering is performed for the fast and accurate image key-point matching. This method has high processing speed and matching quality, which can be used for efficient and accurate image matching.

BRIEF DESCRIPTION OF DRAWINGS

FIG. 1 is the flowchart of the image matching method based on the cascaded binary encoding proposed in this invention.

SPECIFIC IMPLEMENTATIONS

The following content will further describe the technical details of this invention with figures and embodiments.

The image matching approach in this invention proposes a coarse-to-fine cascaded binary encoding method, which combines two search strategies of hashing methods, i.e. hashing look-up and Hamming ranking, and significantly boosts the matching speed of image key-points. The image matching process involves a three-layer hashing structure, from which layer-wise filtering is performed for the fast and accurate image key-point matching.

FIG. 1 depicts the workflow of the image matching method based on the cascaded binary encoding. As demonstrated in the figure, this invention involves the following procedures:

Procedure 101: using the hashing look-up based on multiple hashing tables to coarsely filter the candidate key-points of images to obtain a candidate subset of the candidate key-points.

This procedure is the look-up of candidate key-points based on multiple hashing tables.

Specifically, a coarsest hashing query, i.e. hashing look-up, is performed on the short hashing codes. Each key-point in the image is mapped into a m-bit hashing code vector with the locality sensitive hashing (LSH) method. For the key-point p in the image I, in order to find its corresponding matching point in the image J, a hashing look-up table is constructed from these m-bit hashing code vectors. All the key-points in the image J, which fall into the same hashing bucket with the key-point p, will be returned as candidates.

Hashing look-up has a constant time complexity. In this invention, multi-table hashing look-up is adopted. Specifically, with the locality sensitive hashing method, L different hashing functions are generated, i.e. $g_l(q)=(h_{1,l}(q), h_{2,l}(q), \ldots, h_{m,l}(q), l=1, 2, \ldots, L$. For each hashing function, a hashing table is constructed, and each key-point p in the image I is put into the corresponding hashing bucket $g_l(p)$, where $l=1, 2, \ldots, L$.

Since longer hashing code vector tends to has more discriminative power, it is more likely that similar points will fall into the same bucket (with probability $P_1$) instead of dissimilar points (with probability $P_2$). When m increases, the probability $P_1$ will drop, so that L should be sufficiently large to ensure that the true nearest neighbor will fall into the same bucket with the query point at least once. To be specific, this probability is given by $1-(1-P_1)^L$.

Different parameters, in and L, can be selected for different applications. For instance, in the context of image matching in 3-D reconstruction, a common setting is m=8 (10) and L=6.

Procedure 102: Projecting the candidate subset of the candidate key-points into a high-dimensional Hamming space.

After the coarse search in the Procedure 101, Procedure 102 can perform a more fine-grained search of the candidate subset obtained in the previous step, e.g. compute each candidate key-point's Euclidean distance to the query point. However, since the candidate subset is still rather large, extensive computation will be involved for the direct computation of Euclidean distance. In this invention, these candidate key-points are projected into a high-dimensional Hamming space with a longer n-bit hashing function (n>m), in which the Hamming distance is computed and used as the ranking metric.

Procedure 103: Build a hashing table with Hamming distance as the key and data address as the value, and search through this hashing table to obtain the optimal matching key-point.

For more accurate key-point matching, it is essential to find the top-K nearest neighbors in the Hamming space, and then use the top-2 nearest neighbors in the Euclidean space to determine whether a key-point matching exists.

To find the top-K nearest neighbors, it usually requires to traverse the database K times, which can be very time-consuming when the database is large. In this invention, a hashing-based top-K nearest neighbor search method is proposed, which only requires to traverse the database once to locate the top-K elements.

Specifically, during the traversal of the database, the Hamming distance between each candidate key-point and the query point is computed. A hashing table is built, using the Hamming distance as the key and the memory address of the candidate key-point as the value. Therefore, after traversing the database once, a complete "Hamming distance-memory address" hashing table is constructed.

To locate the top-K elements, the search starts from the table entry with the minimal key; if the elements in the first entry are fewer than K, then the search continues with the second table entry, until at least K candidates has been retrieved. The K candidate key-points discovered from the above process are guaranteed to be the top-K nearest neighbors of the query point in the Hamming space.

In conclusion, during the image key-points extraction and representation stages, this invention firstly detects key-points in the two images ($I_1$ and $I_2$) to be matched, and then represents them as feature vectors. For instance, image key-points can be detected by the SIFT feature detector and represented as 128-dimensional feature vectors.

During the key-point matching stage, a three-layer cascaded binary encoding method is adopted to perform one-to-one matching for those key-points that fall into the overlapping regions in the two images ($I_1$ and $I_2$) to be matched. For each key-point $x_i$ in the image $I_1$, the hashing look-up with multiple hashing tables is used to coarsely filter all the key-points $y_j$ in the image $I_2$ in the sense of the Hamming distance, and produces a candidate subset $\tilde{Y}$. All the key-points in the candidate subset $\tilde{Y}$ are then projected into a high-dimensional Hamming space, which enables fast retrieval of top-K nearest neighbors of the query point. Here, K can be set to different values depending on the specific applications, e.g. K=2 is a common choice in the context of image matching in the 3-D reconstruction.

For two images ($I_1$ and $I_2$) to be matched, assuming there are N key-points in both images. The time complexity to compute the Euclidean distance is denoted as $T_E$, while $T_H$ stands for the time complexity for the Hamming distance computation. Note that under modern CPU architectures, it only takes one CPU clock to compute the Hamming distance between two 128-dimensional 0/1-valued vectors. Therefore, the computation overhead for the Hamming distance computation, $T_H$, is by far smaller than $T_E$, the computation overhead for the Euclidean distance computation.

The brute-force key-point matching algorithm exhaustively checks all the key-points in the image $I_2$ to compute the Euclidean distance to each key-point in the image $I_1$, so as to determine the primary and secondary nearest neighbors. Hence, the overall time complexity is given by $O(N^2 \cdot T_E)$.

The tree-based key-point matching algorithm finds the primary and secondary nearest neighbors in the image $I_2$ for each key-point in the image $I_1$ based on the tree-structure indexing, which computes the Euclidean distance for log N times in average. Hence, the overall time complexity is given by $O(N \log N \cdot T_E)$.

The key-point matching proposed in this invention produces a candidate subset containing $LN/2^m$ key-points in average after the first-phase hashing look-up with multiple hashing tables for each key-point in the image $I_1$, of which the computation overhead can be omitted. The Hamming distance is computed for each key-point in the candidate subset, in order to locate the top-K nearest neighbors with a time complexity of $O(LN/2^m \cdot T_H)$. For these top-K nearest neighbors, their Euclidean distances to the query point is computed in $O(K \cdot T_E)$ time. Hence, the overall time complexity is given by $O(LN^2/2^m \cdot T_H + NK \cdot T_E)$.

Based on the above analysis on the time complexity, it is obvious that the brute-force key-point matching algorithm has the highest time complexity. The tree-based key-point matching algorithm has a lower time complexity than brute-force hashing-based matching method when the number of key-points in each image is large, but usually these two methods perform closely to each other. However, the key-point matching algorithm proposed in this invention, with properly chosen parameters (when in and L are small, e.g. m=8 and L=6), can achieve more than 10 times speed-up than the tree-based key-point matching algorithm.

In addition, persons skilled in the art should be aware of that the units and algorithm procedures of each example described in the published embodiments in this invention can be carried out on electronic hardware, computer software, or the combination of these two. To clearly demonstrate the exchangeability between hardware and software, each example's composition and procedures are described generally according to the functions in the above content. The choice between hardware or software implementation depends on specific applications and design constraints of the technical solution. Persons skilled in the art can use different ways to implement the described functionalities for each specific application, but such implementation should not be considered as beyond the scope of this invention.

The method or algorithm procedures described in the published embodiments in this invention can be implemented on hardware, software modules executed by processors, or the combination of these two. Software modules can be placed in the random access memory (RAM), internal memory, real-only memory (ROM), electrically programmable read-only memory (EPROM), electrically erasable programmable read-only memory (EEPROM), register, hard disk, removable disk, CD-ROM, or any other publicly known storage media in the technical domain.

The above specific implementations have further explained the purpose, technical solutions, and beneficial effect of this invention. It should be understood that the above statement is merely a demonstration of implementations of this invention, rather than a limitation of the protective scope. All the modification, equivalent replacement, and improvement under the essence and principal of this invention, should be included in the protective scope of this invention.

The invention claimed is:

1. An image matching method based on cascaded binary encoding, characterized in that the stated method includes:
   Procedure S1: Using a hashing look-up with multiple hashing tables to coarsely filter candidate key-points in the image to produce a candidate subset of the candidate key-points;
   Procedure S2: Projecting the candidate subset of the candidate key-points into a high-dimensional Hamming space;
   Procedure S3: Building a "Hamming distance-memory address" hashing table, and obtaining the optimal matching key-point by querying this hashing table.

2. The method described in claim 1, characterized in that the stated Procedure S1 is specified as:
   Procedure S11: Perform the coarse hashing look-up with short hashing codes, in which all the key-points in the images are mapped as m-bit hashing code vectors with the locality sensitive hashing method.

3. The method described in claim 2, characterized in that the stated Procedure S11 is specified as:
   For the first key-point p in the first image I, m-bit hashing code vectors are used to build a hashing look-up table, based on which all the key-points in the second image J that fall into the same hashing bucket with the first key-point p are returned,
   wherein, L different hashing functions are generated by the locality sensitive hashing method, denoted as $g_l(q)=(h_{1,l}(q), h_{2,l}(q), \ldots, h_{m,l}(q))$, $l=1, 2, \ldots, L$, and a hashing table is then built for each hashing function, and the first key-point p in the first image I is put into the hashing bucket $g_l(p)$, where $l=1, 2, \ldots, L$.

4. The method described in claim 1, characterized in that the stated Procedure S2 is specified as:
   All the key-points in the candidate subset are projected into a high-dimensional Hamming space with an n-bit hashing function (n>m), in which each candidate's Hamming distance to the query point is computed and used as the ranking metric.

5. The method described in claim 1, characterized in that the stated Procedure S3 is specified as:
   Compute the first Hamming distance between the query point and candidate key-points;
   Build a hashing table, using the first Hamming distance as the key and memory address of the candidate key-point as the value;
   Traverse the database of the "Hamming distance-memory address" hashing table and build the "Hamming distance-memory address" hashing table;
   The search starts from the table entry with the minimal key, until predetermined candidate key-points have been retrieved, wherein these retrieved key-points are guaranteed to be the top nearest neighbors to the query point in the sense of the Hamming distance.

* * * * *